(12) United States Patent
Kogure

(10) Patent No.: US 6,175,547 B1
(45) Date of Patent: Jan. 16, 2001

(54) POSITIVE AND NEGATIVE ROTATION GAS DYNAMIC PRESSURE BEARING, SPINDLE MOTOR HAVING DYNAMIC PRESSURE BEARING, AND ROTATOR DEVICE HAVING SPINDLE MOTOR AS DRIVING SOURCE

(75) Inventor: Toshiharu Kogure, Chiba (JP)

(73) Assignee: Seiko Instruments Inc. (JP)

(*) Notice: Under 35 U.S.C. 154(b), the term of this patent shall be extended for 0 days.

(21) Appl. No.: 09/162,254

(22) Filed: Sep. 28, 1998

(30) Foreign Application Priority Data

Sep. 29, 1997 (JP) .................................................. 9-264513

(51) Int. Cl.$^7$ ........................... G11B 25/00; G05D 13/08; H02K 7/08; F16C 32/06

(52) U.S. Cl. .............................. 369/269; 137/47; 310/90; 384/100; 384/107

(58) Field of Search .................................... 369/269, 258, 369/261, 266; 360/98.03, 99.04, 99.08; 137/47; 310/67 R, 90, 90.5; 384/100, 107, 112, 114

(56) References Cited

U.S. PATENT DOCUMENTS

| | | | |
|---|---|---|---|
| 4,087,095 | * 5/1978 | Koda | 369/249 |
| 4,366,993 | * 1/1983 | Ono et al. | 384/120 |
| 4,452,396 | * 6/1984 | Cataldo | 239/223 |
| 4,547,081 | * 10/1985 | Tanaka et al. | 384/107 |
| 4,596,114 | * 6/1986 | Donnelly | 57/124 |
| 4,656,545 | * 4/1987 | Kakuta | 360/97.03 |
| 4,797,009 | * 1/1989 | Yamazaki | 384/100 |
| 4,856,918 | * 8/1989 | Inoue et al. | 384/610 |
| 5,430,590 | * 7/1995 | Ainslie et al. | 360/98.07 |
| 5,511,005 | * 4/1996 | Abbe et al. | 702/84 |
| 5,869,941 | * 2/1999 | Shiozaki et al. | 318/481 |

FOREIGN PATENT DOCUMENTS 3-225656 * 10/1991 (JP) ........................................ 369/269

OTHER PUBLICATIONS

*Mechanical Society of Japan,* vol. 58, No. 555, article No. 92–0550, Nobuyoshi Kawabata et al., Nov. 1992, "Regular and Reversible Rotation–Type Gas–Lubricated Herringbone–Grooved Journal Bearing Utilizing Pump–In and Pump–Out Effect".

(List continued on next page.)

*Primary Examiner*—Hoa T. Nguyen
*Assistant Examiner*—Julie Anne Watko
(74) *Attorney, Agent, or Firm*—Adams & Wilks

(57) ABSTRACT

A positive and negative rotation gas dynamic pressure bearing comprises a stationary bearing member, a movable bearing member mounted for rotation relative to the stationary bearing member, dynamic pressure generating grooves having first and second ends and formed in one of confronting surfaces of the stationary bearing member and the movable bearing member, a self-switch valve connected to the movable bearing member for rotation therewith, and conducting holes having first and second ends and formed in the movable bearing member. During rotation of the movable bearing member in a first direction of rotation, a high dynamic pressure is generated at central portions of the dynamic pressure generating grooves, and a valve body of the self-switch valve moves toward a lower space of a valve case of the self-switch valve to close the second ends of the conducting holes. During rotation of the movable member in a second direction of rotation opposite the first direction of rotation, a high dynamic pressure is generated at the first and second ends of the dynamic pressure generating grooves so that the valve body moves toward an upper space of the valve case to close a through-bore of the valve case and to open the second ends of the conducting holes to allow air taken in by air taking holes of the self-switch valve to be supplied to the central portions of the dynamic pressure generating grooves through the conducting holes.

6 Claims, 3 Drawing Sheets

OTHER PUBLICATIONS

*Mechanical Society of Japan,* vol. 59, No. 568, article No. 93–0465, Nobuyoshi Kawabata et al., Dec. 1993, "Regular and Reversible Rotation–Tye Gas–Lubricated Circuit–Disk Grooved Thrust Bearing".

*Mechanical Society of Japan,* vol. 56, No. 528, article No. 93–0465, Nobuyoshi Kawabata et al., Aug. 1990, "Spiral Grooved Bearing Utilizing the Pumping Effect of a Herringbone Journal Bearing (Method of Numerical Calculation and Influences of Bearing Parameters".

* cited by examiner

POSITIVE AND NEGATIVE ROTATION GAS DYNAMIC PRESSURE BEARING, SPINDLE MOTOR HAVING DYNAMIC PRESSURE BEARING, AND ROTATOR DEVICE HAVING SPINDLE MOTOR AS DRIVING SOURCE

BACKGROUND OF THE INVENTION

Field of the Invention

The present invention relates to a positive and negative rotation gas dynamic pressure bearing, a spindle motor, and a rotator device which are able to open and close a conducting hole to generate a lubricating function of a pump-out effect without an electromagnetic switching valve, and which are able to decrease run out because dynamic pressures generating at dynamic pressure generating grooves arranged equally toward a circumference direction during rotation and generating a lubricating function of a pump-in effect to close the conducting hole are all equal.

A positive and negative rotation gas dynamic pressure bearing is a gas dynamic pressure bearing which generates a lubricating function of a pump-in effect to increase dynamic pressure at central portions of the dynamic pressure generating grooves taking in lubricating gas from both ends of the dynamic pressure generating grooves during rotation in one of positive and negative rotations, and which generates a lubrication function of a pump-out effect to increase dynamic pressure at both ends of the dynamic pressure generating grooves and to receive a supply of lubricating gas from the central portions middle of the dynamic pressure generating grooves during rotation in the other of the positive and negative rotations.

As conventional positive and negative rotation gas dynamic pressure bearings, two articles are disclosed: "Positive and negative rotation herringbone journal gas bearing using both of pump-in type and pump-out type", Vol. 58, No. 555 in collection published by Mechanical Society of Japan (article No. 92-0550, Article 1, hereafter), and "Positive and negative rotation gas lubrication disc thrust dynamic pressure group bearing", Vol. 59, No. 568 in collection published by Mechanical Society of Japan (article No. 93-0465, Article 2, hereafter.)

In Article 1, a plurality of herringbone dynamic pressure generating grooves which are substantially V-shaped and shallow are formed with equal arrangement toward a circumference direction at an outer circumference surface of a shaft constituting a rotation bearing member. Three conducting holes are bored at a sleeve constituting a bearing stationary member supporting the shaft and are disposed at center portions of herringbone dynamic pressure generating grooves at intervals of 120 degrees, and the conducting holes become supplying paths of the air outside when the three conducting holes generate a lubricating function of a pump-out effect.

In Article 2, herringbone dynamic pressure generating grooves which are substantially L-shaped are formed with equal arrangement toward a circumference direction at an annular plate shape thrust bearing stationary member. Conducting holes passing through the thrust bearing stationary member are bored at center portions of herringbone dynamic pressure generating grooves at intervals of 120 degrees, and the conducting holes become supplying paths of the air outside when the conducting holes generates a lubricating function of a pump-out effect.

In both of Article 1 and Article 2, since as an electromagnetic switching valve shielding the conductive hole, a sensor detecting positive rotation and negative rotation, and a switch circuit switching open and closing operations of the electromagnetic switching valve by signal of the sensor are needed, there is a weak point that manufacturing cost is high and maintenance is needed comparing one direction rotation gas dynamic pressure bearing.

An object of the present invention is to provide a positive and negative rotation gas dynamic pressure bearing, a spindle motor, and a rotator device having a bearing construction generating a lubricating function of a pump-in effect increasing dynamic pressure at central portions of the dynamic pressure generating grooves taking in lubricating gas from both ends of the dynamic pressure generating grooves during rotation in one of positive and negative rotations, and during rotation of in the other of positive and negative rotations generating a lubricating function of a pump-out effect increasing dynamic pressure at both ends of the dynamic pressure generating grooves supplying lubricating gas to central portions of the dynamic pressure generating grooves through the conducting hole. Particularly, by rotating with the bearing movable member and by forming a self-switch valve opening and shutting the conducting hole taking in air depending on the rotation direction, the electromagnetic switching valve, the sensor, and the switch circuit are not needed. Dynamic pressures generating at dynamic pressure generating grooves equally arranged toward a circumference direction are all equal during rotation generating a lubricating function of a pump-in effect by that the self-switch valve shuts the conducting hole so as to decrease run out of rotation.

BRIEF SUMMARY OF THE INVENTION

The present invention is to provide a positive and negative rotation gas dynamic pressure bearing having a bearing stationary member and bearing movable member, and dynamic pressure generating grooves being equally arranged toward a circumference direction at one facing surface of one of the bearing stationary member and the bearing movable member, and further comprising: air taking holes formed in a wall of a valve case at nearly tangential angle about a circumference of the wall, an inner space of which is separated by a valve body freely coming up and down, so as to conduct all the time; an interconnected porosity bored at an upper side space of the valve body, and closed by the valve body during coming up of the valve; and self-switch valve rotating coaxially and in one body with the bearing movable member about the center of the valves, wherein each one end of a plural of independent conducting holes are equally arranged toward a circumference direction at an inner portion of the bearing movable member and corresponds to a position where high dynamic pressure of the same number of dynamic pressure generating grooves are equally arranged toward a circumference direction, and each other end of the independent conducting holes is closed during coming up and down of the valve body of the self-switch valve; and wherein the valve body of the self-switch valve closes the independent conducting hole when the bearing movable member rotates toward a rotation direction where a pump-in effect generating high dynamic pressure generates at central portions of dynamic pressure generating grooves, and the valve body of the self-switch valve opens the independent conducting hole so that lubricating gas is supplied to the central portions of the dynamic pressure generating grooves through the independent conducting hole during rotation of the bearing movable member toward a rotation direction where a pump-out effect generating high dynamic pressure generates at both ends of the central portions of the dynamic pressure generating grooves.

The present invention is to provide a spindle motor, wherein a spindle thereof is supported by a spindle supporting member through a positive and negative rotation gas dynamic pressure bearing, the positive and negative rotation gas dynamic pressure bearing having a bearing stationary member and a bearing movable member, forming dynamic pressure generating grooves being equally arranged toward a circumference direction at one facing surface among the bearing stationary member and the bearing movable member, and further comprising: air taking holes bored at a nearly tangential about a circumference wall of a valve case, an inner space of which is separated by a valve body freely coming up and down, so as to conduct all the time; and interconnected porosity bored at an upper side space of the valve body, and closed by the valve body during coming up of the valve; and a self-switch valve rotating coaxially and in one body with the bearing movable member about the center of the valve; wherein each one of a plurality of independent conducting holes are equally arranged toward a circumference direction at an inner portion of the bearing movable member corresponds to a position where high dynamic pressure of the same number of dynamic pressure generating grooves being equally arranged toward circumference direction generates, and each other end of the independent conducting holes is closed during coming up and down of the valve body of the self-switch valve; and wherein the valve body of the self-switch valve closes the independent conducting hole when the bearing movable member rotates toward a rotation direction where pump-in effect generating high dynamic pressure generates at central portions of the dynamic pressure generating grooves, and the valve body of the self-switch valve open the independent conducting hole so that lubricating gas is supplied to central portions of the dynamic pressure generating grooves through the independent conducting hole when the bearing movable member rotates toward a rotation direction where a pump-out effect generating high dynamic pressure generates at both ends of middle of the central portions of the dynamic pressure generating grooves.

The present invention is also directed to a rotator device wherein a rotated body such as polygon mirror, a magnetic disc, an optical disc or the like is attached to a spindle of the spindle motor.

BRIEF DESCRIPTION OF THE DRAWINGS

FIG. 1A is a center longitudinal sectional view; and FIG. 1B is a horizontal sectional view of a self-switch valve.

DETAILED DESCRIPTION OF THE PREFERRED EMBODIMENTS

Figure 1A:
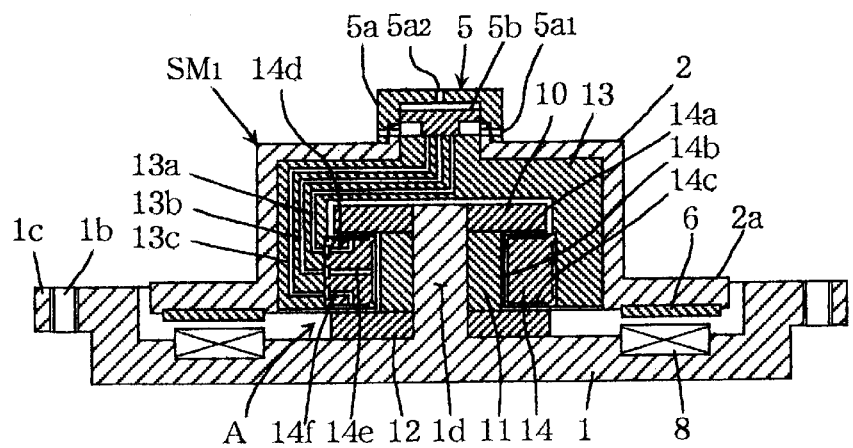
FIGS. 1A and 1B are views showing a first embodiment of a spindle motor of the present invention.

Referring FIGS. 1A and 1B, a first embodiment of a spindle motor of the present invention will be described. In the spindle motor $SM_1$, a spindle 2 is supported by a spindle supporting member 1 through a positive and negative rotation gas dynamic pressure bearing A having both a radial bearing function and a thrust bearing function, and the motor undergoes positive and negative rotation (i.e., rotation in opposite directions) by means of a permanent magnet 6 and motor coil 8.

Particularly, the spindle supporting member 1 has a supporting shaft 1d at a center portion thereof and an attaching flange 1c having bored thread holes 1b. The spindle 2 has a brim 2a at a lower end thereof supporting the permanent magnet 6.

The positive and negative rotation gas dynamic pressure bearing A comprises bearing stationary members 10, 11 and 12 inserted outside of and fixed to the supporting shaft 1d formed at the center portion of the spindle supporting member 1, a substantially cup-shaped bearing supporting member 13 inserted inside of and fixed to the spindle 2, a bearing movable member 14 inserted inside of and fixed to the bearing supporting member 13, and a self-switch valve 5.

The bearing stationary members 10, 11, and 12 and the bearing movable member 14 are all made of ceramic or other wear resisting material.

Twelve dynamic pressure generating grooves 14a, 14b, and 14c having herringbone grooves are equally arranged toward a circumference direction at each of an upper surface, an inner circumference surface, and a lower surface of the bearing movable member 14. The dynamic pressure generating grooves may be other than herringbone grooves, and may be formed at a surface of the bearing stationary members 10, 11 and 12 facing the bearing movable member 14.

The self-switch valve 5 is fixed at an upper surface portion of the spindle 2 for rotation therewith and coaxially about a center of the valve.

The self-switch valve 5 has a valve case 5a and a valve body 5b. The valve body 5b is movable up and down freely and separates the inside space of the valve case 5a in upper and lower spaces. As shown in FIG. 1B, there are three air taking holes $5a_1$ bored at a nearly tangential angle about the circumference wall of the valve case 5a, the holes $5a_1$ being equally arranged toward a circumference direction so as to be in continuous communication with the lower space of the valve body 5b. A through-bore $5a_2$ is disposed at a central part of an upper surface portion of the valve case 5a and communicates with the upper space of the valve body 5b. The air taking holes $5a_1$ are formed so as to be equally arranged toward a circumference direction in order to maintain a dynamic balance.

In the twelve dynamic pressure generating grooves 14a, each center bending portion of three dynamic pressure generating grooves placed at a position divided circumferentially into three equal parts and the lower space of the valve body 5b are joined independently through three independent conducting holes 13a (only one is shown in the figure) bored at the bearing supporting member 13 and three independent conducting holes 14d (only one is shown in the figure) bored at the bearing supporting member 14.

Similarly in the twelve dynamic pressure generating grooves 14b, each center bending portion of three dynamic pressure generating grooves placed at a position divided circumferentially into three equal parts and the lower space of the valve body 5b are joined independently through three independent conducting holes 13b and three independent conducting holes 14e. In the twelve dynamic pressure generating grooves 14c, each center bending portion of three dynamic pressure generating grooves placed at a position divided circumferentially into three equal parts and the lower section of the valve body 5b are joined independently through three independent conducting holes 13c and three independent conducting holes 14f.

Figure 1B:
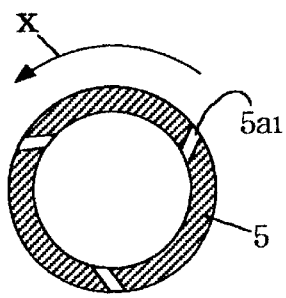

The spindle 2 rotates by means of the permanent magnet 6 and the motor coil 8, and when the self-switch valve 5 rotates in the direction of arrow X as shown in FIG. 1B, the air taking holes $5a_1$ take lubricating gas (air) into the lower section of the valve body 5b, and the valve body 5b rises by pressure of the lubricating gas. The high pressure lubricating gas flows to the center bending portions of the dynamic pressure generating grooves 14a, 14b, and 14c through the independent conducting holes 13a and 14d, 13b and 14e, or 13c and 14f so as to show lubricating function of pump-out effect generating high pressure at both ends of the dynamic pressure generating grooves 14a, 14b, and 14c.

When the spindle 2 rotates in the opposite direction and the self-switch valve 5 rotates in the opposite direction of arrow X, as the air taking holes $5a_1$ do not take in lubricating gas and the valve body 5b closes the independent conducting holes 13a, 13b, and 13c by falling under the action of gravity, lubricating gas is taken from both ends of the dynamic pressure generating grooves 14a, 14b, and 14c so as to show lubricating function of pump-in effect generating high dynamic pressure at the center bending portion of the dynamic pressure generating grooves. At this time, as the dynamic pressure generating grooves 14a, 14b, and 14c conducting the independent conducting holes do not conduct each other through the independent conducting holes, dynamic pressures of twelve dynamic pressure generating grooves 14a, 14b, and 14c do not interfere each other and run out of rotation decreases.

Figure 2:
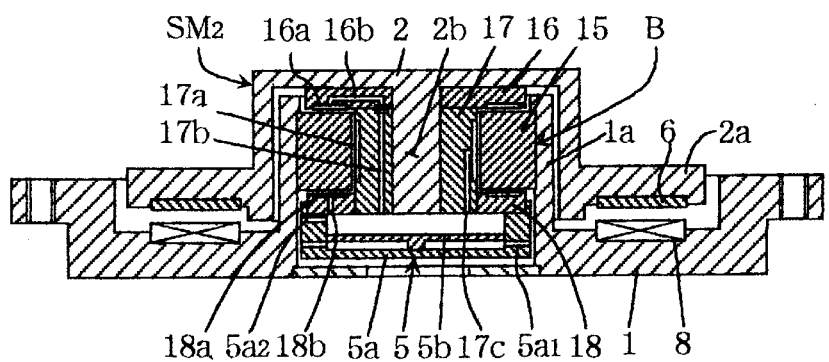
FIG. 2 is a center longitudinal sectional view showing a second embodiment of a spindle motor of the present invention.

FIG. 2 shows a second embodiment of a spindle motor of the present invention.

In the spindle motor $SM_2$, a spindle 2 is supported by a spindle supporting member 1 through a positive and negative rotation gas dynamic pressure bearing B having both of a radial bearing function and a thrust bearing function, and the motor undergoes positive and negative rotation by means of a permanent magnet 6 and motor coil 8.

The positive and negative rotation gas dynamic pressure bearing B comprises a bearing stationary member 15 inserted inside and fixed at a cylindrical wall 1a of the spindle supporting member 1, bearing movable members 16, 17, and 18 inserted outside and fixed by a supporting shaft 2b coming down from a central part of an upper surface portion of the spindle 2, and a self-switch valve 5.

Twelve dynamic pressure generating grooves 16a, 16b, and 16c having herringbone grooves are equally arranged in a circumference direction at a lower space surface of the bearing movable member 16, an inner circumference surface of the bearing movable member 17, and an upper surface of the bearing movable member 18, respectively.

The self-switch valve 5 is inserted in a space formed in the spindle supporting member 1 and is fixed to the bearing movable member 18.

There are three air taking holes $5a_1$ bored at a nearly tangential angle about the circumference wall of the valve case 5a being equally arranged toward a circumference direction so as to be in continuous communication with a lower space of the valve body 5b. There are two through-bores $5a_2$ at a central part of an upper surface portion of the valve case which communicate with an upper space of the valve body 5b. The air taking holes $5a_2$ are formed so as to be equally arranged toward a circumference direction in order to maintain a dynamic balance.

In the twelve dynamic pressure generating grooves 16a, each center bending portion of three dynamic pressure generating grooves placed at a position divided circumferentially into three equal parts and the upper space of the valve body 5b are joined independently through three independent conducting holes 17b, 16b (only one is shown in the figure) bored at the bearing movable members 17 and 16.

Similarly, in the twelve dynamic pressure generating grooves 17a, each center bending portion of three dynamic pressure generating grooves placed at a position divided circumferentially into three equal parts and the upper space of the valve body 5b are joined independently through three independent conducting holes 17c. In the twelve dynamic pressure generating grooves 18a, each center bending portion of three dynamic pressure generating grooves placed at a position divided circumferentially into three equal parts and the upper space of the valve body 5b are joined independently through three independent conducting holes 18b.

The spindle 2 rotates by means of the permanent magnet 6 and the motor coil 8, and the self-switch valve 5 rotates with the spindle 2. When the valve body 5a of the self-switch valve 5 closes the independent conducting hole by being lifted by the pressure of lubricating gas (air) taken in by the air taking holes $5a_1$ and occupying the lower space of the valve body 5b, the positive and negative rotation gas dynamic pressure bearing B shows lubricating function of pump-in effect. When the spindle 2 rotates in the opposite direction, the air taking holes $5a_1$ do not take in lubricating gas and the valve body 5b falls under the action of gravity away from the independent conducting hole, and thus the positive and negative rotation gas dynamic pressure bearing B shows lubricating function of pump-out effect.

At showing lubricating function of pump-in effect, as the dynamic pressure generating grooves 16a, 17a, and 18a communicating with the independent conducting holes do not communicate with each other through the independent conducting holes, the dynamic pressures of the twelve dynamic pressure generating grooves 16a, 17a, and 18a do not interfere each other and, therefore, run out of rotation decreases.

Figure 3:
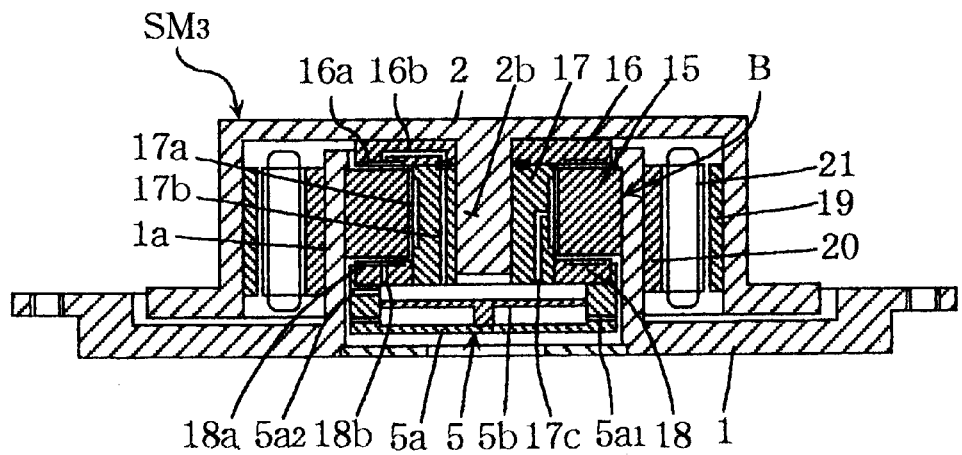
FIG. 3 is a center longitudinal sectional view showing a third embodiment of a spindle motor of the present invention.

FIG. 3 shows a third embodiment of a spindle motor of the present invention.

In the spindle motor $SM_3$, a spindle 2 is supported by a spindle supporting member 1 through a positive and negative rotation gas dynamic pressure bearing B having both of a radial bearing function and a thrust bearing function, and the motor undergoes positive and negative rotation by means of a permanent magnet 19 inserted inside and fixed at the spindle 2. A motor coil 21 is disposed within a slot of a stator 20 inserted outside and fixed at a cylindrical wall 1a of the spindle supporting member 1.

Comparing FIG. 3 with FIG. 2, the only difference between both spindly motors relates to the permanent magnet 19, the stator 20, and the motor coil 21. In all other respects, positive and negative rotation gas dynamic pressure bearing B in FIG. 3 is the same as the bearing shown in FIG. 2. Accordingly, similar reference symbols in FIGS. 2 and 3 correspond to the same structure and further description thereof is omitted.

Figure 4:
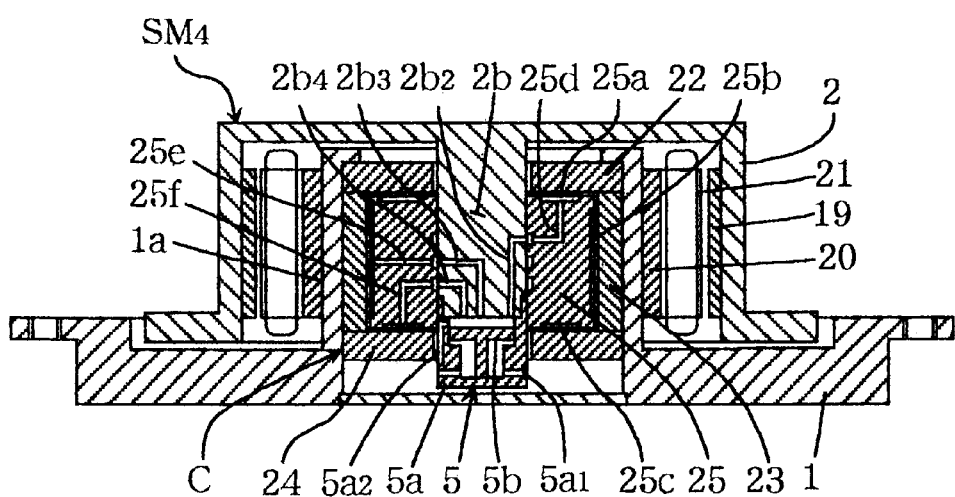
FIG. 4 is a center longitudinal sectional view showing a fourth embodiment of a spindle motor of the present invention.

FIG. 4 shows a fourth embodiment of a spindle motor of the present invention.

In the spindle motor $SM_4$, a spindle 2 is supported by a spindle supporting member 1 through a positive and negative rotation gas dynamic pressure bearing C having both of radial bearing function and a thrust bearing function, and the motor undergoes positive and negative rotation by means of a permanent magnet 19 and a motor coil 21.

Comparing FIG. 4 with FIG. 3, the difference between the two spindle motors is in the positive and negative rotation gas dynamic pressure bearing C. The positive and negative rotation gas dynamic pressure hearing C comprises bearing stationary members 22, 23, and 24 inserted inside and fixed to a cylindrical wall 1a of the spindle supporting member 1, a bearing movable member 25 inserted outside and fixed by a supporting shaft 2b coming down from a central part of an upper surface portion of the spindle 2, and a self-switch valve 5.

Twelve dynamic pressure generating grooves 25a, 25b, and 25c having herringbone grooves are equally arranged in a circumference direction at each of a lower surface, an outer circumference surface, and an upper surface of the bearing movable member 25.

The self-switch valve 5 has substantially same construction and function as the self-switch valve shown in FIG. 2 and is inserted inside and fixed to the bearing movable member 25.

There are three air taking holes $5a_1$ bored at a nearly tangential angle about a circumference wall of the valve case 5a being equally arranged toward a circumference direction so as to be in continuous communication with a lower space of the valve body 5b. There is a through-bore $5a_2$ at a central part of an upper surface portion of the valve case 5a which communicates with an upper space of the valve body 5b.

In the twelve dynamic pressure generating grooves 25a, each center bending portion of three dynamic pressure generating grooves placed at a position divided circumferentially into three equal parts and the upper space of the valve body 5b are joined independently through three independent conducting holes 25d, $2b_2$ (only one is shown in the figure) bored at the bearing movable member 25 and the supporting shaft 2b.

Similarly in the twelve dynamic pressure generating grooves 25b, each center bending portion of three dynamic pressure generating grooves placed at a position divided circumferentially into three equal parts and the upper space of the valve body 5b are joined independently through three independent conducting holes 25e, $2b_3$. In the twelve dynamic pressure generating grooves 25c, each center bending portion of three dynamic pressure generating grooves placed at a position divided circumferentially into three equal parts and the upper space of the valve body 5b are joined independently through the independent conducting holes 25e and $2b_4$.

Therefore, as the self-switch valve 5 is disposed below the independent conducting hole similarly to the self-switch valve shown in FIG. 2, the self-switch valve has the same function as the self-switch valve 5 shown in FIG. 2. When the valve body 5a is lifted and closes the independent conducting hole, the positive and negative rotation gas dynamic pressure bearing C shows lubricating function of pump-in effect. When the valve body 5b falls under the action of gravity away from the independent conducting hole, the positive and negative rotation gas dynamic pressure bearing C shows lubricating function of pump-out effect.

Figure 5:
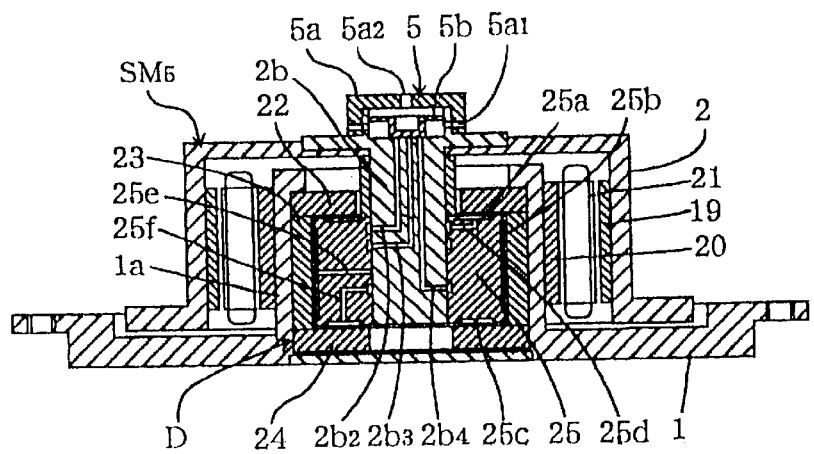
FIG. 5 is a center longitudinal sectional view showing a fifth embodiment of a spindle motor of the present invention.

FIG. 5 shows a fifth embodiment of a spindle motor of the present invention.

In the spindle motor $SM_5$, a spindle 2 is supported by a spindle supporting member 1 through a positive and negative rotation gas dynamic pressure bearing D having both of a radial bearing function and a thrust bearing function, and the motor undergoes positive and negative rotation by a permanent magnet 19 and motor coil 21.

Comparing FIG. 5 with FIG. 4, the difference in structure is in the supporting shaft 2b coming down from the central part of the upper surface portion of the spindle 2 and in the self-switch valve 5 of the positive and negative rotation gas dynamic pressure bearing D being formed at an upper side.

In the positive and negative rotation gas dynamic pressure bearing D, by forming the self-switch valve 5 at the upper side of the spindle motor, as described above for the positive and negative rotation gas dynamic pressure bearing B of FIG. 1, when the valve body 5b opens by being lifted, the positive and negative rotation gas dynamic pressure bearing D shows lubricating function of pump-out effect. When the valve body 5b falls under the action of gravity and closes the independent conducting hole, the positive and negative rotation gas dynamic pressure bearing D shows lubricating function of pump-in effect.

In FIGS. 4 and 5, the same symbols correspond to the same elements, and thus further description is omitted.

Figure 6:
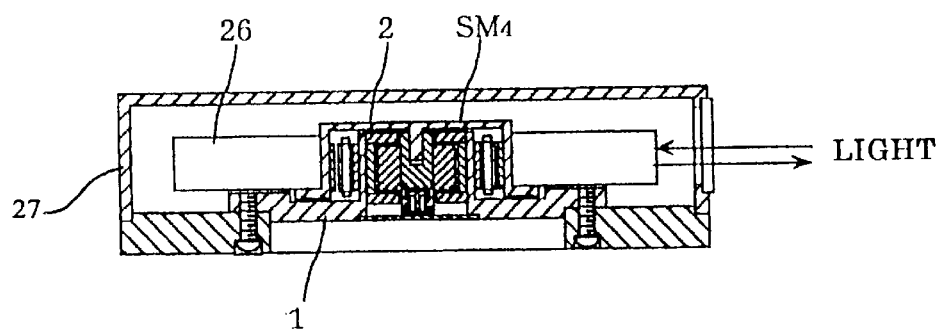
FIG. 6 is a center longitudinal sectional view showing a first embodiment of a rotator device of the present invention.

FIG. 6 shows a rotator device adopting a spindle motor of the present invention. In the rotator device, the spindle 2 of the spindle motor $SM_4$ of FIG. 4 is covered by a polygon mirror 26, and a spindle supporting member 1 of the spindle motor $SM_4$ is fixed to a bottom plate of a mirror case 27.

Figure 7:
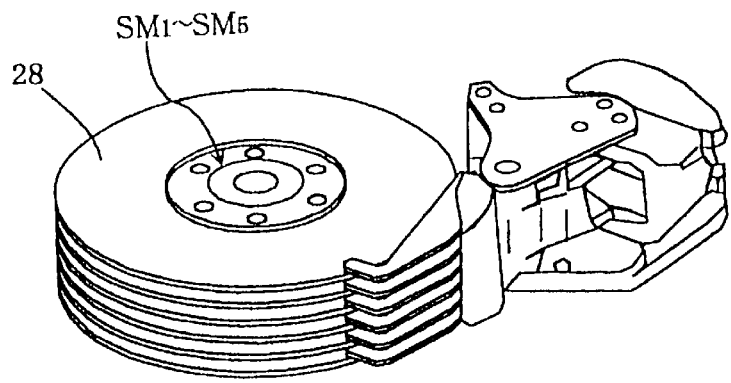
FIG. 7 is a center longitudinal sectional view showing a second embodiment of a rotator device of the present invention.

FIG. 7 shows a rotator device of the present invention adopting any of the spindle motors according to the embodiments of FIGS. 1–5. The rotator device is a disc driving device, and in the device, a plurality of rotational discs 28, such as magnetic discs or optical discs, are attached to a spindle of spindle motors $SM_1$ to $SM_5$.

The rotator devices shown in FIGS. 6 and 7 have the function, operation, and advantages of the bearings according to the present invention.

As described above, a positive and negative rotation gas dynamic pressure bearing, a spindle motor, and a rotator device generate lubricating function of pump-in effect increasing dynamic pressure at middle of the dynamic pressure generating grooves taking lubricating gas from both ends of the dynamic pressure generating grooves during any rotation among positive and negative rotations. During other rotation among positive and negative rotations, the bearing device, the spindle motor, and the rotator device generate lubricating function of pump out effect increasing dynamic pressure at both ends of the dynamic pressure generating grooves supplying lubricating gas through the conducting hole to middle of the dynamic pressure generating grooves.

By forming a self-switch valve rotating with the bearing movable member and by opening and closing the conducting hole which takes in air depending on the direction of rotation, a switch for switching the electromagnetic valve and a sensor are not required. During rotation generating lubricating function of pump-in effect because the self-switch valve closes the conducting hole, all of dynamic pressure generating the dynamic pressure generating grooves equally arranged toward circumference direction are equal and run out of rotation can be decreased.

What is claimed is:

1. A positive and negative rotation gas dynamic pressure bearing comprising: a stationary bearing member; a movable bearing member mounted for rotation relative to the stationary bearing member, the movable bearing member having a surface in spaced-apart and confronting relation to a surface of the stationary bearing member; a plurality of dynamic pressure generating grooves formed in one of the confronting surfaces of and equally arranged about a circumference of the stationary bearing member and the movable bearing member, each of the dynamic pressure generating grooves having a first end portion, a second end portion, and a central portion disposed between the first and second end portions; a self-switch valve connected to the movable bearing member for rotation therewith, the self-switch valve having a valve case having an inner space, a valve body disposed within the inner space for undergoing movement therein and for separating the inner space into an upper space and a lower space, a plurality of air taking holes for taking air into the lower space and formed in a wall of the valve case at a nearly tangential angle about a circumference of the wall, and a through-bore formed in a surface of the valve case; and a plurality of conducting holes each communicating the lower space of the valve case with one of the dynamic pressure generating grooves, the conducting holes being formed in the movable bearing member and equally arranged about a circumference of the movable bearing member, each of the conducting holes having a first end disposed at a position corresponding to a position of the respective dynamic pressure generating groove where the dynamic pressure generating groove generates high dynamic pressure during rotation of the movable bearing member in a first direction of rotation, and each of the conducting holes having a second end opposite the first end and which is closed by the valve body of the self-switch valve during movement of the valve body within the inner space; wherein during rotation of the movable bearing member in the first direction of rotation, a high dynamic pressure is generated at the central portions of the dynamic pressure generating grooves, and the valve body of the self-switch valve moves toward the lower space of the valve case to close the second ends of the conducting holes; and wherein during rotation of the movable member in a second direction of rotation opposite the first direction of rotation, a high dynamic pressure is generated at the first and second ends of the dynamic pressure generating grooves so that the valve body of the self-switch valve moves toward the upper space of the valve case to close the through-bore of the valve case and to open the second ends of the conducting holes to allow air taken in by the air taking holes to be supplied to the central portions of the dynamic pressure generating grooves through the conducting holes.

2. In a spindle motor having a spindle mounted for rotation and a supporting body, a positive and negative rotation gas dynamic pressure bearing according to claim 1 for rotatably supporting the spindle with respect to the supporting body.

3. In a rotator device having a spindle mounted for rotation, a rotator connected to the spindle for rotation therewith, and a supporting body, a positive and negative rotation gas dynamic pressure bearing according to claim 1 for rotatably supporting the spindle with respect to the supporting body.

4. A positive and negative rotation gas dynamic pressure bearing comprising: a stationary bearing member; a movable bearing member mounted for rotation relative to the stationary bearing member, the movable bearing member having a surface in spaced-apart and confronting relation to a surface of the stationary bearing member; a plurality of dynamic pressure generating grooves formed in one of the confronting surfaces of the stationary bearing member and the movable bearing member, each of the dynamic pressure generating grooves having a first end portion, a second end portion, and a central portion disposed between the first and second end portions; a self-switch valve connected to the movable bearing member for rotation therewith, the self-switch valve having a valve case having an inner space, a valve body disposed within the inner space for undergoing movement therein, a plurality of air taking holes for taking air into the inner space and formed in a wall of the valve case at a nearly tangential angle about a circumference of the wall, and a through-bore formed in a surface of the valve case; and a plurality of conducting holes each communicating the inner space of the valve case with one of the dynamic pressure generating grooves, each of the conducting holes having a first end disposed at a position corresponding to a position of the respective dynamic pressure generating groove where the dynamic pressure generating groove generates high dynamic pressure during rotation of the movable bearing member in a first direction of rotation, and each of the conducting holes having a second end opposite the first end and which is closed by the valve body of the self-switch valve during movement of the valve body within the inner space; wherein during rotation of the movable bearing member in the first direction of rotation, a high dynamic pressure is generated at the central portions of the dynamic pressure generating grooves, and the valve body of the self-switch valve moves within the inner space of the valve case to close the second ends of the conducting holes; and wherein during rotation of the movable member in a second direction of rotation opposite the first direction of rotation, a high dynamic pressure is generated at the first and second ends of the dynamic pressure generating grooves so that the valve body of the self-switch valve moves within the inner space of the valve case to close the through-bore of the valve case and to open the second ends of the conducting holes to allow air taken in by the air taking holes to be supplied to the central portions of the dynamic pressure generating grooves through the conducting holes.

5. In a spindle motor having a spindle mounted for rotation and a supporting body, a positive and negative rotation gas dynamic pressure bearing according to claim 4 for rotatably supporting the spindle with respect to the supporting body.

6. In a rotator device having a spindle mounted for rotation, a rotator connected to the spindle for rotation therewith, and a supporting body, a positive and negative rotation gas dynamic pressure bearing according to claim 4 for rotatably supporting the spindle with respect to the supporting body.

* * * * *